US011998405B2

(12) United States Patent
Müllner et al.

(10) Patent No.: US 11,998,405 B2
(45) Date of Patent: Jun. 4, 2024

(54) METHOD FOR PLANNING A DENTAL STRUCTURE (71) Applicant: SIRONA DENTAL SYSTEMS GMBH, Bensheim (DE)

(72) Inventors: Daniel Müllner, Zürich (CH); Clemens Gross, Lautertal (DE)

(73) Assignee: DENTSPLY SIRONA INC., York, PA (US)

( * ) Notice: Subject to any disclaimer, the term of this patent is extended or adjusted under 35 U.S.C. 154(b) by 789 days.

(21) Appl. No.: 16/344,829

(22) PCT Filed: Oct. 30, 2017

(86) PCT No.: PCT/EP2017/077804
§ 371 (c)(1),
(2) Date: Apr. 25, 2019

(87) PCT Pub. No.: WO2018/078164
PCT Pub. Date: May 3, 2018

(65) Prior Publication Data
US 2019/0247165 A1  Aug. 15, 2019

(30) Foreign Application Priority Data
Oct. 31, 2016  (DE) .......................... 102016221426.8

(51) Int. Cl.
*A61C 13/00* (2006.01)
*A61C 9/00* (2006.01)
(Continued)

(52) U.S. Cl.
CPC ........ *A61C 13/0004* (2013.01); *A61C 9/0006* (2013.01); *G06F 30/00* (2020.01);
(Continued)

(58) Field of Classification Search
CPC . A61C 13/0004; A61C 9/0006; A61C 8/0068; A61C 1/084; G06F 30/00;
(Continued)

(56) References Cited

U.S. PATENT DOCUMENTS

2002/0064748 A1* 5/2002 Chishti .................. G16H 50/50
433/24
2005/0089822 A1* 4/2005 Geng ...................... G06F 30/00
433/167
(Continued)

FOREIGN PATENT DOCUMENTS

| | | |
|---|---|---|
| CN | 102426614 A | 4/2012 |
| DE | 102009011442 A1 | 9/2010 |
| WO | 2004060197 A1 | 7/2004 |

OTHER PUBLICATIONS

Araujo, Anna Carla, Guillaume Fromentin, and Gérard Poulachon. "Analytical and experimental investigations on thread milling forces in titanium alloy." International Journal of Machine Tools and Manufacture 67 (2013): 28-34. (Year: 2013).*
(Continued)

*Primary Examiner* — Boris Gorney
*Assistant Examiner* — David A Hopkins
(74) *Attorney, Agent, or Firm* — DENTSPLY SIRONA INC.

(57) ABSTRACT

The invention related to a method for planning a dental structure, in which a 3D model of the structure, with at least one radially symmetrical aperture, is already provided. On the basis of the 3D model of the structure that is already provided, an axis of symmetry of the at least one radially symmetrical aperture of the structure is determined in relation to said 3D model.

16 Claims, 3 Drawing Sheets (51) Int. Cl.
  *G06F 30/00* (2020.01)
  *G06F 30/10* (2020.01)
  *G06F 30/20* (2020.01)
  *G06T 19/20* (2011.01)
  *A61C 1/08* (2006.01)
  *A61C 8/00* (2006.01)

(52) U.S. Cl.
  CPC ............. *G06F 30/10* (2020.01); *G06F 30/20* (2020.01); *G06T 19/20* (2013.01); *A61C 1/084* (2013.01); *A61C 8/0068* (2013.01); *G06T 2210/41* (2013.01); *G06T 2219/2004* (2013.01); *G06T 2219/2021* (2013.01)

(58) Field of Classification Search
  CPC ......... G06F 30/20; G06F 30/10; G06T 19/20; G06T 2219/2021; G06T 2210/41; G06T 2219/2004
  See application file for complete search history.

(56) References Cited

U.S. PATENT DOCUMENTS

| | | | |
|---|---|---|---|
| 2005/0142517 A1* | 6/2005 | Frysh | A61C 13/0004 433/173 |
| 2006/0019219 A1 | 1/2006 | Saliger | |
| 2006/0106484 A1* | 5/2006 | Saliger | A61C 13/0004 433/172 |
| 2007/0015111 A1* | 1/2007 | Kopelman | G16H 30/20 433/213 |
| 2007/0134625 A1* | 6/2007 | Leu | A61C 8/0048 433/215 |
| 2012/0239364 A1* | 9/2012 | Glor | A61C 13/0004 703/11 |
| 2012/0308963 A1* | 12/2012 | Hasselgren | A61C 8/0036 433/201.1 |
| 2013/0144417 A1* | 6/2013 | Pieper | A61C 1/084 700/98 |
| 2013/0308843 A1* | 11/2013 | Tank | G06T 7/149 382/128 |
| 2014/0343706 A1* | 11/2014 | Hart | A61C 13/00 433/173 |
| 2015/0025855 A1* | 1/2015 | Fisker | A61C 1/082 703/1 |
| 2016/0008109 A1* | 1/2016 | Hauth | A61C 13/0004 433/213 |
| 2018/0200029 A1 | 7/2018 | Schnitzspan | |

OTHER PUBLICATIONS

Alghazzawi, Tariq F. "Advancements in CAD/CAM technology: Options for practical implementation." Journal of prosthodontic research 60.2 (2016): 72-84. (Year: 2016).*

Araujo, Anna Carla, and Guillaume Fromentin. "Modeling thread milling forces in mini-hole in dental metallic materials." Procedia CIRP 58 (2017): 623-628. (Year: 2017).*

Buser, Daniel, William Martin, and Urs C. Belser. "Optimizing esthetics for implant restorations in the anterior maxilla: anatomic and surgical considerations." International Journal of Oral & Maxillofacial Implants 19.7 (2004). (Year: 2004).*

Bártolo, Paulo, and Bopaya Bidanda, eds. Bio-materials and prototyping applications in medicine. New York, NY, USA:: Springer, 2008. Chapter 8 (Year: 2008).*

Merriam Webster Dictionary, Definition of "screw", Accessed Mar. 13, 2023; URL: www(dot)merriam-webster(dot)com/dictionary/screw#:~:text=screwed%3B%20screwing%3B%20screws,(2) (Year: 2023).*

Chiarelli, Tommaso, Evelina Lamma, and Tommaso Sansoni. "Techniques to improve preoperative planning precision for oral implantology." IEEE Transactions on Instrumentation and Measurement 59.11 (2010): 2887-2897. See the abstract and §§ I.A-I.B (Year: 2010).*

Dreiseidler, Timo, et al. "Accuracy of a newly developed integrated system for dental implant planning." Clinical oral implants research 20.11 (2009): 1191-1199. See the abstract and pp. 1192, 1194-1195 (Year: 2009).*

Cucchiara, Rita, Evelina Lamma, and Tommaso Sansoni. "An image analysis approach for automatically re-orienteering CT images for dental implants." Computerized Medical Imaging and Graphics 28.4 (2004): 185-201. See the abstract, §§ 1-2 and 5, include seeing § 5.2 (Year: 2004).*

Galanis, Christos C., et al. "Computer methods for automating preoperative dental implant planning: Implant positioning and size assignment." Computer methods and programs in biomedicine 86.1 (2007): 30-38. See the abstract and §§ 3.1, 4.2-4.3 (Year: 2007).*

International Preliminary Report on Patentability; PCT/ EP2017/077804; dated Apr. 30, 2019 (Issued).

International Search Report; PCT/EP2017/077804; Jan. 5, 2018 (completed); dated Jan. 22, 2018 (mailed).

Written Opinion of the International Searching Authority; PCT/ EP2017/077804; Jan. 5, 2018 (completed); dated Jan. 22, 2018 (mailed).

* cited by examiner

METHOD FOR PLANNING A DENTAL STRUCTURE

TECHNICAL FIELD

The invention relates to a method for planning a dental structure, wherein a 3D model of the structure having at least one radially symmetrical opening is already provided.

BACKGROUND OF THE INVENTION

A number of methods for planning a dental structure, whereby the planned structure is automatically milled or ground out of a blank using a CAD/CAM method, are known from the state of the art. To do this, control paths are defined to control the tools of the processing machine.

One disadvantage of these methods is in particular that openings of the structures cannot be carved out precisely enough, because the tools of the processing machine sometimes carve out the openings obliquely or sideways layer by layer.

The object of the present invention is therefore to provide a method for planning a dental structure that makes a precise production of the planned structure possible, whereby in particular openings of the structures are carved out as precisely and in a manner that is as gentle on the tool as possible.

SUMMARY OF THE INVENTION

The invention relates to a method for planning a dental structure, wherein a 3D model of the structure having at least one radially symmetrical opening is already provided. On the basis of the already existing 3D model of the structure, an axis of symmetry of the at least one radially symmetrical opening of the structure is determined in relation to said 3D model.

The dental structure can be any structure comprising a radially symmetrical opening. The 3D model of the structure is already provided. The 3D model can be a triangle mesh, for example, and only describe the shape of the surface of the structure. Aside from the form of the triangle mesh, however, the 3D model does not contain any information about the exact position and orientation of the opening.

The 3D model can, for example, be available in a generic data format for the exchange of 3D models between different CAD/CAM systems. Such a generic data format, such as the STL file format for example, contains only a triangle mesh of the surface of the 3D model without any additional information.

On the basis of the existing 3D model, the axis of symmetry of the opening is determined automatically or semiautomatically using a computer-assisted method. The radially symmetrical opening can be a screw channel of an implant-supported dental restoration, for example, a cylindrical guide channel of a drilling template or also a cut-out for scan bodies. A screw channel can also have a conical shape, at least partially a cylindrical shape or any widening with different profiles.

One advantage of this method is that the position and orientation of the axis of symmetry relative to the 3D model is determined automatically or semiautomatically on the basis of the 3D model, so that the control paths of a CAM machine can be optimized accordingly. The openings can be carved out more precisely as a result of the optimized control paths of the CAM machine. A second advantage is that there is little wear on the used tools of the CAM machine when carving out the blank. This is because high laterally acting forces, in particular, can lead to a fracture or damage to the milling tools or the grinding tools of the CAM processing machine. With optimized control paths of the CAM processing machine, the milling tools or the grinding tools are used as parallel as possible to the identified axis of symmetry of the opening, so that the forces acting laterally on the tool are as small as possible.

The control path of a CAM processing machine can describe any movement of the tool, whereby the tool is moved layer by layer along the control path, as a result of which the structure is carved out of the blank.

The structure can advantageously be a single abutment having a screw channel, a bridge having at least one screw channel, a drilling template having at least one drill channel, an impression tray having at least one opening or a model casting having at least one opening.

A single abutment can, for example, comprise a cylindrical screw channel for inserting a screw. A bridge can, for example, comprise a plurality of cylindrical screw channels for connecting to set implants. A drilling template can comprise at least one drill channel, provided for guiding a drill during implant drilling. A guide sleeve, for example, can be inserted into the drill channel of the drilling template. The impression tray can also comprise openings, which provide enough space for scan bodies that are attached to implants. The impression tray can be an individual impression tray that is produced using a CAD/CAM method, wherein the openings are designed such that the scan bodies attached to the implants can fit through them. A model casting can likewise comprise openings, which are cylindrical or widened. It is essential to the following method that the structure be producible using a CAD/CAM method with the aid of a CAM processing machine.

The 3D model of the structure can advantageously be a triangle mesh and describe the surface of the structure.

The surface of the structure is thus precisely described by means of the triangle mesh.

To determine the axis of symmetry of the opening, the 3D model of the structure can advantageously be displayed by means of a display device and virtually rotated in such a way that the user is virtually able to look through the opening, i.e. in a 2D projection of the 3D model on the display device, the user sees the opening as a hole.

The user can therefore see the opening as a hole in order to roughly define a provisional axis of symmetry of the opening. The display device can be a monitor screen, for example.

The user can advantageously define a provisional reference point for the axis of symmetry within the hole.

The user can thus set any point within the hole as a reference point for the axis of symmetry. The reference point for the axis of symmetry is the point in the 2D projection through which the axis of symmetry passes.

In order to define the position of the axis of symmetry in addition to the direction of the axis of symmetry, the user sets an arbitrary point within the hole as the reference point. The provisional axis of symmetry is then the straight line in projection direction of the 2D projection on the screen through the defined reference point in the plane of the screen.

The center point of the hole, which defines a provisional reference point through which the axis of symmetry passes, can advantageously be determined automatically using a computer-assisted method.

The center point of the hole is thus determined automatically and defined as the reference point for the axis of symmetry.

In the computer-assisted method, the hole can advantageously be automatically identified in a 2D projection of the 3D model by segmenting a cast shadow of the 3D model and then identifying the center point as a centroid of the hole.

The center point of the hole is determined by segmenting the cast shadow of the 3D model. In a segmentation method, a distinction is made between an outer region, at least one hole and the structure, so that an edge line of the hole or an area of each hole is identified. The centroid of the area or the edge line then forms the reference point for the provisional axis of symmetry. The reference point for the axis of symmetry is thus determined fully automatically.

To determine the axis of symmetry of the opening, the 3D model of the structure can advantageously be displayed by means of a display device, wherein, on a surface of the 3D model, a closed curve is drawn around the opening by the user. The closed curve can be drawn on a surface that is flat or on a surface that is uneven.

The closed curve around the opening can have a winding number of +1 or −1 about the provisional axis of symmetry. A winding number is the integral over the changes in the angles at which the curve extends relative to the axis of symmetry. If the angles are measured in degrees, the integral is normalized with $1/360$. A winding number of +1 corresponds to a circumferential angle of 360°, whereas a winding number of −1 corresponds to a circumferential angle of −360°. The admissibility of the two signs +1 and −1 means that the orientation of the curve is irrelevant.

An interpolation plane, in which the closed curve is centered, can advantageously be determined with the aid of the closed curve, wherein a provisional axis of symmetry is determined perpendicular to the determined interpolation plane, wherein a centroid of the closed curve is determined as a reference point for the axis of symmetry.

If the provisional axis of symmetry determined in this way intersects the triangle mesh of the 3D model and can therefore not extend entirely within the opening, other axes of symmetry through the fixed reference point are tested in random directions until a valid axis of symmetry is found, which does not intersect the triangle mesh of the 3D model and also forms the winding number +1 or −1 with the closed curve, or, after a specific number of failed attempts, the user input of the closed curve is rejected with an error message. The number of failed attempts can be at least 2000, for example. The directions of random attempts of the axes of symmetry are, for example, uniformly distributed in all spatial directions without specific conditions according to a random distribution.

The interpolation plane is then placed through the closed curve. The position and orientation of the provisional axis of symmetry is thus determined semiautomatically on the basis of the closed curve. The centroid of the closed curve corresponds to a geometric centroid, whereby the geometric centroid corresponds to a mean value of all the points on the closed curve.

The closed curve can advantageously be drawn by the user by selecting anchor points on the surface of the structure, whereby an interpolation curve is automatically drawn through the anchor points.

An interpolation curve is thus determined automatically by means of the defined anchor points. The interpolation curve can thus be identified during the selection of anchor points or after the input process for the anchor points.

In order to determine the axis of symmetry of the opening by means of a computer-assisted search algorithm, at least one opening can advantageously be identified automatically, wherein a closed curve around the opening is identified on a surface of the 3D model using a computer-assisted algorithm, wherein an interpolation plane, in which the closed curve is centered, is determined on the basis of the closed curve, wherein a provisional axis of symmetry is determined perpendicular to the determined interpolation plane, wherein a centroid of the closed curve is determined as a reference point for the axis of symmetry.

In this embodiment, therefore, the opening is identified automatically, a closed curve around the opening is defined automatically, an interpolation plane through the closed curve is determined automatically, and a provisional axis of symmetry perpendicular to the interpolation plane is defined automatically, whereby the reference point for the axis of symmetry is automatically determined as the geometric centroid of the closed curve.

The identified provisional axis of symmetry is then tested to see whether it suitable. If the identified provisional axis of symmetry intersects the 3D model and is therefore not suitable, other axes of symmetry through the fixed reference point are tested in random directions until a valid axis of symmetry is found, which does not intersect the 3D model, or, after a specific number of failed attempts, the candidate for a possible opening is rejected as invalid. When generating the random directions of possible axes of symmetry, all spatial directions are, for example, taken into account in a uniformly distributed manner.

Therefore, according to this embodiment, the method is carried out fully automatically. This reduces the time of the planning and eliminates erroneous inputs by the user.

The surface of the structure can advantageously be a bottom surface of a connecting geometry around the opening of the structure.

The connecting geometry is in particular present in the case of implant-supported restorations to connect said geometry to a set implant. The bottom surface of the connecting geometry is flat and has a distinct edge.

To define the closed curve, a computer-assisted edge detection algorithm can advantageously be used, which automatically identifies an edge of the bottom surface of the connecting geometry and defines it as the closed curve around the opening.

The edge of the bottom surface of the connecting geometry is thus identified automatically and defined as the closed curve around the opening. Due to the fact that the bottom surface is flat and the edge of the connecting geometry can have a circular shape, the determination of the provisional axis of symmetry is improved.

In the application of the computer-assisted search algorithm, incorrect candidates for a possible axis of symmetry of the opening can advantageously be eliminated with the aid of established criteria.

The openings are thus identified automatically by means of the computer-assisted search algorithm, whereby incorrect candidates are eliminated. This takes place fully automatically, thereby reducing the time of the planning and preventing input errors by the user.

Incorrect candidates for the axes of symmetry are eliminated both prior to the optimization of the axis of symmetry and after the optimization of the axis of symmetry.

Advantageously, a first criterion for eliminating incorrect candidates for a possible axis of symmetry can be that a valid axis of symmetry of the opening does not intersect the 3D model.

Therefore, the axis of symmetry extends through the opening without intersecting the 3D model. Candidates for axes of symmetry that do not satisfy this criterion are eliminated.

A second criterion for eliminating incorrect candidates for a possible axis of symmetry can advantageously be that the closed curve has a winding number of +1 or −1 about a valid axis of symmetry.

This ensures that calculated axes of symmetry having an invalid direction relative to the closed curve are eliminated.

After the determination of a provisional axis of symmetry of the opening, an optimization can advantageously take place at a narrowest segment of the opening, wherein, using an iterative process, the provisional axis of symmetry is modified in such a way that a cylinder fits into the opening around the axis of symmetry with a largest possible radius, wherein an optimized axis of symmetry of the opening is determined as a result of the iterative process.

The modification of the axis of symmetry is both in terms of its direction and in terms of its position.

The provisional axis of symmetry is thus optimized using the iterative process, wherein the cylinder is inscribed into the opening around the axis of symmetry with the largest possible radius. The exact optimized axis of symmetry for both cylindrical and conical radially symmetrical openings is thus obtained with this method.

A third criterion for eliminating incorrect candidates for a possible axis of symmetry after the optimization can advantageously be that a distance from a valid axis of symmetry to the 3D model is not less than a set minimum distance.

Candidates for possible axes of symmetry having a distance from the 3D model that is less than the minimum distance are thus eliminated. The minimum distance can, for example, be defined by the options for carving out an opening using a CAM processing machine. The minimum distance can therefore correspond to a radius of a milling tool or a grinding tool of the CAM processing machine.

A fourth criterion for eliminating incorrect candidates for a possible axis of symmetry after the optimization can advantageously be that a length of the opening is less than a set minimum length.

Candidates for possible axes of symmetry are thus eliminated if the opening has a length that is less than a set minimum length. A minimum length can, for example, be 2 mm or 1 mm along the axis of symmetry of the opening.

After the determination of the axis of symmetry, a complete reconstruction of the radially symmetrical opening can advantageously take place with a known axis of symmetry, wherein the reconstructed opening is assigned to the already provided 3D model of the structure.

As a result, therefore, the reconstruction of the opening is assigned to the 3D model. The 3D model along with the opening can also be displayed by means of a display device.

The shape of the opening is not known in advance, but is instead reconstructed from the existing 3D model. In particular a radial profile of the opening is determined by utilizing the radial symmetry of the opening. All the nodal points of the 3D model are projected into the plane by the projection (rho, phi, z)→(rho, z) of the cylinder coordinates relative to the axis of symmetry (radius: rho, polar angle: phi, parameters along the axis: z). Subsequently, all the endpoints of edges of the 3D model are connected by edges in the 2D projection as well. The envelope of this projection with a minimal rho-coordinate is then the radial profile of the opening.

Taking into account the position and orientation of the axis of symmetry of the opening relative to the structure as well as a radial profile of the opening, a control path of a CAM processing machine can advantageously be optimized in order to carve the opening from a blank as precisely and in a manner that is as gentle on at least one used tool of the CAM processing machine as possible.

The control paths of the CAM processing machine are thus optimized as a function of the orientation and position of the axis of symmetry and as a function of the radial profile. The control paths can, for example, be optimized in such a way that the processing tools of the CAM processing machine, such as a milling tool or a grinding tool, carve out the openings largely parallel to the axis of symmetry, so that the forces acting laterally on the processing tool are as small as possible. The control path corresponds to the programmed path of the processing tool for carving the structure out of the blank by means of the CAM processing machine.

BRIEF DESCRIPTION OF THE DRAWINGS

The invention is explained with reference to the drawings. The drawings show.

DETAILED DESCRIPTION OF THE INVENTION

Figure 1:
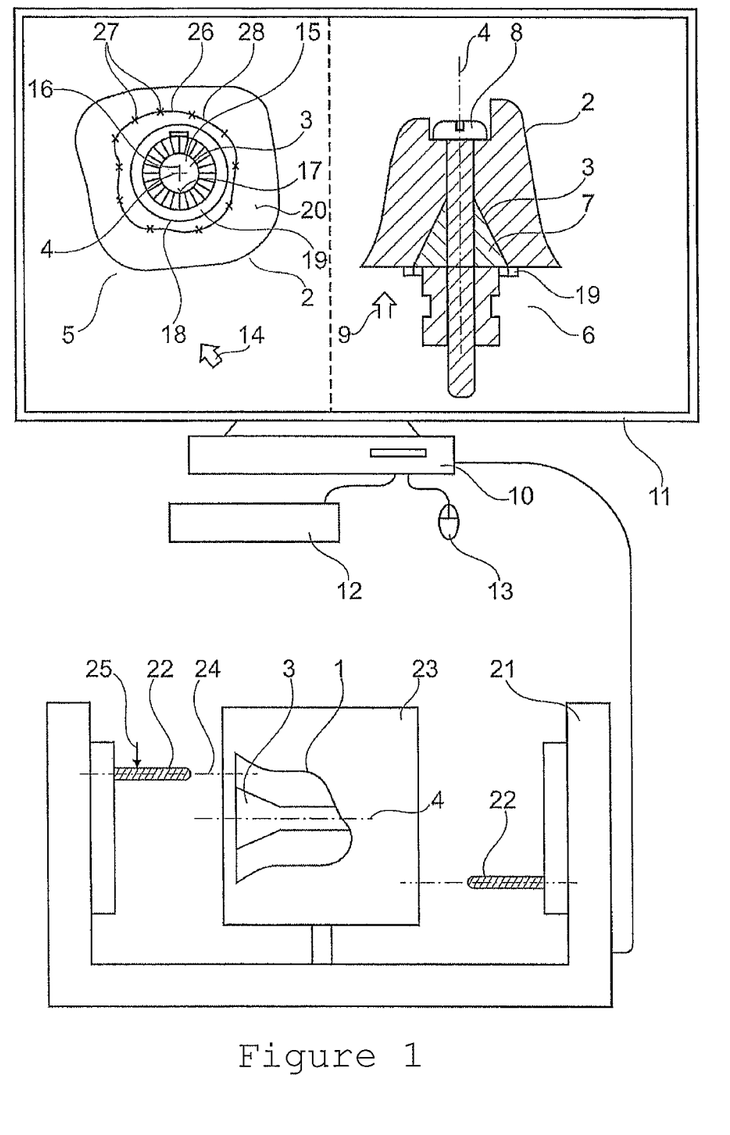
FIG. 1 a sketch for illustrating the present method.

FIG. 1 shows a sketch for illustrating the present method for planning a dental structure 1, such as an abutment, wherein a 3D model 2 of the structure 1 having at least one radially symmetrical opening 3 is already provided. An axis of symmetry 4 of the opening 3 is determined on the basis of the already provided 3D model 2 of the reconstruction 1. The axis of symmetry 4 is shown in a plan view 5 of the 3D model 2 and in a sectional view 6 from the side as a dash-dotted line. In the sectional view 6, the radially symmetrical opening 3 of the 3D model 2 is shown having a cylindrical segment and a conical segment. A titanium base 7, the connection of which is shaped as a truncated cone, is additionally shown to illustrate the function of the abutment. When the abutment is inserted, the abutment 2 is placed onto the titanium base and screwed to the implant already set in the jaw of the patient by means of a screw 8. In addition to the illustrated abutment 2 having a screw channel 3, the dental structure can advantageously also be a bridge having a plurality of screw channels, a drilling template having at least one drill channel, an impression tray having at least one opening or a model casting having at least one opening. The 3D model 2 of the structure 1 can be a triangle mesh, for example. The arrow 9 shows the direction of the plan view 5 in the side view 6. The present computer-assisted method is carried out by means of a computer 10 to which a display device 11, such as a screen, and operating elements, such as a keyboard 12 and a mouse 13, are connected. The user can carry out the planning by means of the operating elements 12 and 13 using a virtual cursor 14.

In a first embodiment of the method, as shown in the plan view 5, the axis of symmetry 4 of the opening 3 is determined by virtually rotating the 3D model 2 in such a way that the user can look through the opening 3. Therefore, in a 2D projection of the 3D model 2, the user sees a hole 15 in the opening 3. In the next step, the user can define a provisional reference point 16 for the axis of symmetry 4 within the hole 15. The center point of the hole 15 can also be determined automatically using a computer-assisted method, by determining a geometric centroid of an edge line 17 of the hole 15.

In an alternative method, the axis of symmetry 4 of the opening 3 can be determined by the user drawing a closed curve 18 around the opening 3 using the cursor 14 and the operating elements 12 and 13. In the present case, the closed curve 18 can correspond to a circular edge of a connecting geometry 19 that is provided for connecting to the titanium base 7. The selection of the closed curve 18 can be carried out, for example, by selecting anchor points on a surface 20 of the 3D model, in the present case along the edge 18. The anchor points are then connected to one another by an interpolation curve.

In the first step, the 3D model 2 is therefore only roughly aligned by the user until a hole 15 is seen. This is followed by the precise determination of the axis of symmetry by means of an optimization method.

The curve 18 does not have to be drawn precisely and also does not have to be circular; it can be drawn quickly and roughly. The only important thing is that the curve 18 is closed and is positioned or extends around the opening 3.

In a further embodiment of the present method, the opening 3 is identified by means of a computer-assisted search algorithm, wherein the closed curve 18 is determined automatically, wherein an interpolation plane that passes through the closed curve 18 is determined. In the next step, a provisional axis of symmetry 4 perpendicular to the interpolation plane is determined, wherein a geometric centroid of the closed curve 18 is determined as a reference point 16 for the axis of symmetry 4.

Alternatively to manually selecting the anchor points on the closed curve 18, an automatic computer-assisted edge detection algorithm can also be used, which automatically identifies the edge 18, for example of the connecting geometry 19, and defines it as the closed curve around the opening 3.

To determine the actual axis of symmetry 4, an iterative process is applied after a provisional axis of symmetry is defined, and an optimization is carried out at the narrowest segment by modifying the provisional axis of symmetry until a cylinder having a largest possible radius fits into the opening 3. After the determination of the axis of symmetry 4, a complete reconstruction of the radially symmetrical opening 3 is carried out, wherein the reconstructed shape of the opening is arranged relative to the 3D model as a function of the identified axis of symmetry 4. The 3D model, the identified axis of symmetry 4 and the reconstructed opening 3 can be displayed at the same time by means of the display device 11. Taking into account the position and orientation of the axis of symmetry 4 and the shape of the opening, which in the present case is cylindrical in sections and conical in sections, a control path of a CAM processing machine 21 is optimized in order to carve the opening 3 out of a blank 23 as precisely and in a manner that is as gentle on the tools 22 of the CAM processing machine 21 as possible. The structure 1 to be produced is arranged within the blank 23 in such a way that the axis of symmetry 4 is oriented parallel to a central axis 24 of the tool 22. If the orientation of the axis of symmetry 4 is not parallel, undercuts can occur during the processing of the blank.

The forces acting laterally on the tool, as represented by the arrow 25, are thus minimized during the processing of the blank 23. The opening is consequently carved out more precisely and there is less wear on the at least one tool 22 of the CAM processing machine.

Alternatively to the circular edge of the connecting geometry 19 as the closed curve 18, the user can also define a closed curve 26 on the uneven surface 20, whereby the user defines anchor points 27 and an interpolation curve 28 is automatically drawn through the anchor points 27.

Figure 2:
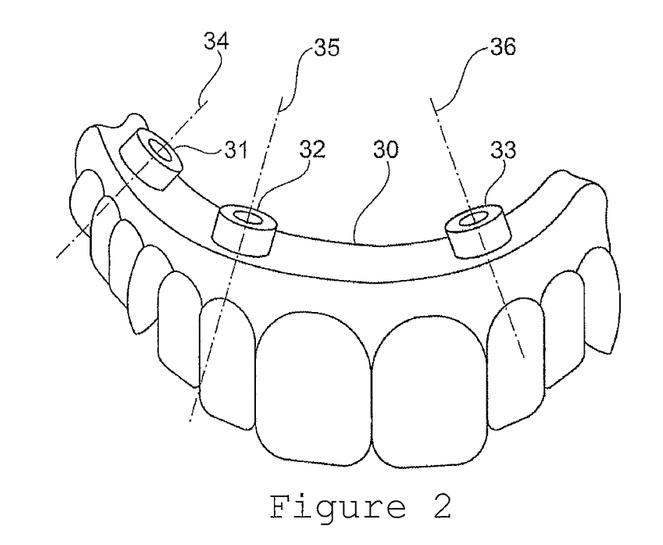
FIG. 2 a sketch of a bridge having a plurality of screw channels

FIG. 2 shows a sketch of a bridge 30 having a first screw channel 31, a second screw channel 32 and a third screw channel 33, wherein the shown bridge represents the structure planned according to the present method. A first axis of symmetry 34, a second axis of symmetry 35 of the second screw channel and a third axis of symmetry 36 of the third screw channel 33 are determined. To determine the axes of symmetry 34, 35 and 36, the method steps described in relation to FIG. 1 are carried out for each of the radially symmetrical openings or screw channels 31, 32 and 33. The control path of the CAM processing machine 21 of FIG. 1 can then be adapted accordingly as a function of the identified axes of symmetry 34, 35 and 36 to minimize the lateral forces 25 on the tools 22.

Figure 3:
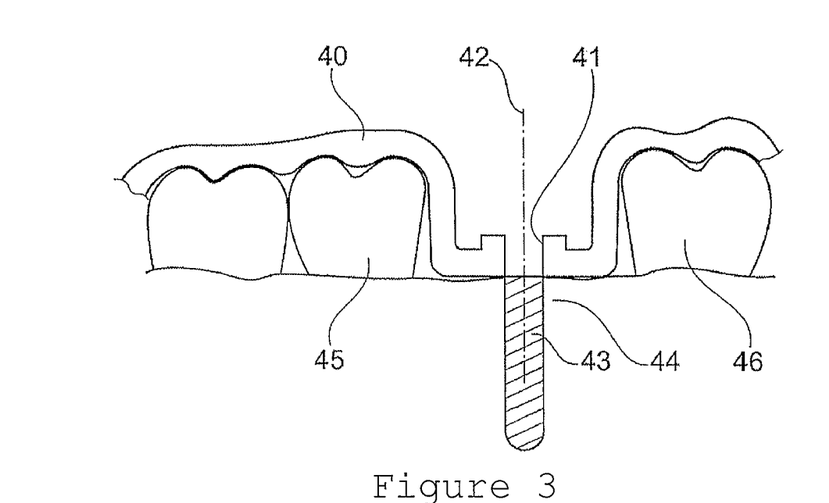
FIG. 3 a sketch of a drilling template as a dental structure

FIG. 3 shows a sketch of a drilling template 40 as a dental structure having a drill channel 41 as the opening. An axis of symmetry 42 of the drill channel 41 is determined using the present method. The drilling template 40 is used to carry out an implant drilling 43 in a jaw bone 44 of a patient, wherein the drilling template 40 is placed onto adjacent teeth 45 and 46 and a dental drill is guided with the aid of the drill channel 41. The drilling template 40 is likewise produced by means of the CAM processing machine of FIG. 1, wherein the control paths of the CAM processing machine are adapted accordingly as a function of the identified axis of symmetry 42 to minimize lateral forces on the tools 22.

Figure 4:
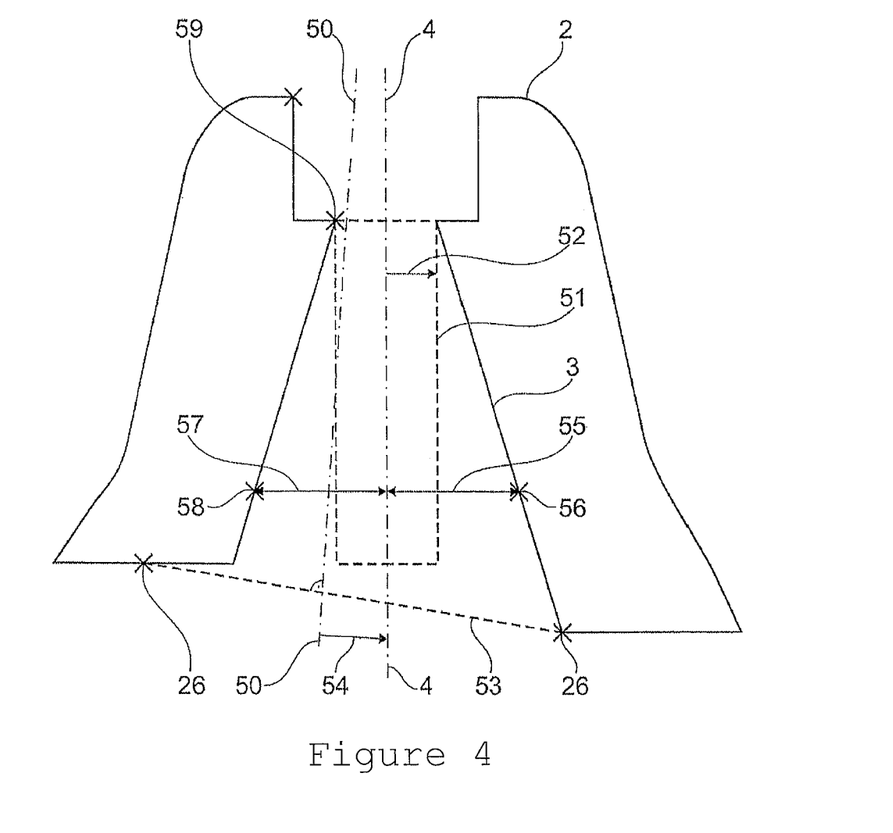
FIG. 4 a sketch for explaining the iterative optimization method.

FIG. 4 shows a sketch for explaining the iterative optimization method for identifying the axis of symmetry 4 of the 3D model 2. A provisional axis of symmetry 50 is modified using an iterative process until a cylinder 51 having a largest possible radius 52 fits into the opening 3. As a result, therefore, an optimized axis of symmetry 4 of the opening 3 is identified. In the present case, the provisional axis of symmetry 50 was identified by defining a closed curve 26 of FIG. 1 around the opening 3 and placing an interpolation plane 53 through the edge 26, whereby the provisional axis of symmetry 50 was disposed perpendicular to the interpolation plane 53. During the optimization, the provisional axis of symmetry 50 was moved to the optimized axis of symmetry 4, as indicated by the arrow 54, whereby both the orientation and the position of the provisional axis of symmetry 50 were modified during the application of the optimization method. The radial symmetry of the opening 3 can be used as a further criterion for testing the optimized axis of symmetry 4. It can be checked, for example, whether an inner radius 55 perpendicular to the optimized axis of symmetry 4 to a contact point 56 on an inner side of the opening 3 corresponds to a second inner radius 57 between the optimized axis of symmetry 4 and a second contact point 58 in another direction perpendicular to the axis of symmetry 4. In general, the provisional axis of symmetry 50 and the optimized axis of symmetry 4 are askew to one another. When carrying out the optimization method, in each iterative step, the current best provisional axis of symmetry is moved and rotated in a plane defined by the current provisional axis of symmetry 50 and a current closest point 59 of the 3D model 2 to the current provisional axis of symmetry 50, in such a way that a distance between the provisional axis of symmetry and the 3D model 2 is increased. This is indicated by the arrow 54.

REFERENCE SIGNS

1 Structure
2 3D model

3 Radially symmetrical opening/screw channel
4 Axis of symmetry
5 Plan view
6 Lateral sectional view
7 Titanium base
8 Screw
9 Direction arrow
10 Computer
11 Display device
12 Keyboard
13 Mouse
14 Cursor
15 Hole
16 Reference point
17 Edge line
18 Closed curve/edge
19 Connecting geometry
20 Surface
21 CAM processing machine
22 Tools
23 Blank
24 Central axis of the tool
25 Direction of the lateral force
30 Bridge
31 First screw channel
32 Second screw channel
33 Third screw channel
34 First axis of symmetry
35 Second axis of symmetry
36 Third axis of symmetry
40 Drilling template
41 Drill channel
42 Axis of symmetry
43 Implant bore
44 Jaw bone
45, 46 Adjacent teeth
50 Provisional axis of symmetry
51 Cylinder
52 Radius
53 Interpolation plane
54 Direction of the local optimization
55 Inner radius
56 Point on the surface of the 3D model
57 Second inner radius
58 Point on the surface of the 3D model
59 Closest point

The invention claimed is:

1. A computer-implemented method comprising:
planning a dental structure, by:
providing a 3D model of the dental structure having at least one radially symmetrical opening;
determining a provisional axis of symmetry by one of:
(a) generating a provisional reference point in the radially symmetrical opening that defines the provisional axis of symmetry to be generated, and computing the provisional axis of symmetry by generating a straight line that passes through the provisional reference point; or
(b) generating a closed curve around the radially symmetrical opening, the closed curve is not restricted to a circle, generating an interpolation plane passing through edges of the closed curve; and disposing, responsive to the interpolation plane being generated, the provisional axis of symmetry perpendicular to the interpolation plane;
computing an optimized axis of symmetry of the radially symmetrical opening from the provisional axis of symmetry by iteratively modifying a current position and orientation of the provisional axis of symmetry until a radial symmetry criterion is satisfied by iteratively moving and rotating, in a plane defined by the provisional axis of symmetry and a closest point of the 3D model to the provisional axis of symmetry, the provisional axis of symmetry such that a first inner radius perpendicular to the provisional axis of symmetry and between the provisional axis of symmetry and a first contact point on an inner side of the radially symmetrical opening matches a second inner radius perpendicular to the provisional axis of symmetry and between the provisional axis of symmetry and a second contact point on an inner side of the radially symmetrical opening in another direction, the first contact point is different from the second contact point; and
manufacturing the dental structure, using a CAM (Computer Aided Manufacturing) processing machine, from a blank based on said optimized axis of symmetry, by:
arranging the 3D model within the blank such that the optimized axis of symmetry is parallel to a central axis of a tool of the CAM processing machine; and
operating the tool to carve out the radially symmetrical opening parallel or substantially parallel to the optimized axis of symmetry to minimize forces acting laterally on the tool.

2. The computer-implemented method according to claim 1, wherein the dental structure is a structure selected from the list consisting of a single abutment having a screw channel, a bridge having at least one screw channel, a drilling template having at least one drill channel, an impression tray having at least one opening and a model casting having at least one opening.

3. The computer-implemented method according to claim 1, wherein the 3D model of the dental structure is a triangle mesh and describes a surface of the dental structure.

4. The computer-implemented method according to claim 1, wherein (a) is performed, further comprising:
determining the optimized axis of symmetry of the opening by displaying the 3D model of the dental structure using a display device and virtually rotating said 3D model such that a user is virtually able to look through the opening in a 2D projection of the 3D model on the display device, so that the user sees the opening as a hole.

5. The computer-implemented method according to claim 4, further comprising:
automatically determining a center point of the hole, which defines the provisional reference point through which the provisional axis of symmetry passes, using a computer-assisted method.

6. The computer-implemented method according to claim 5, further comprising:
automatically identifying, in said computer-assisted method, the hole in a 2D projection of the 3D model by segmenting a cast shadow of the 3D model and then identifying the center point as a centroid of the hole.

7. The computer-implemented method according to claim 1, wherein (b) is performed and the closed curve is drawn by the user by selecting anchor points on a surface of the dental structure, wherein an interpolation curve is automatically drawn through the anchor points.

8. The computer-implemented method according to claim 1, wherein a surface of the dental structure is a bottom surface of a connecting geometry around the opening of the dental structure.

9. The computer-implemented method according to claim 8, wherein a computer-assisted edge detection is performed to automatically detect an edge of the bottom surface of the connecting geometry and defines said edge as the closed curve around the opening, is used to define the closed curve.

10. The computer-implemented method according to claim 1, further comprising:
   eliminating incorrect candidates for a possible axis of symmetry of the opening are eliminated with the aid of established criteria.

11. The computer-implemented method according to claim 10, wherein a first criterion for the eliminating is that a valid axis of symmetry of the opening does not intersect the 3D model.

12. The computer-implemented method according to claim 10, wherein (b) is performed, wherein a second criterion for the eliminating is that the closed curve has a winding number of +1 or −1 about a valid axis of symmetry.

13. The computer-implemented method according to claim 10, wherein a third criterion for the eliminating is that a distance from a valid axis of symmetry to the 3D model is not less than a set minimum distance.

14. The computer-implemented method according to claim 10, wherein a fourth criterion for the eliminating is that the length of the opening is less than a set minimum length.

15. The computer-implemented method according to claim 1, wherein the tool is a milling or grinding tool.

16. The computer-implemented method according to claim 1, further comprising reconstructing the radially symmetrical opening and arranging the reconstructed radially symmetrical opening relative to the 3D model as a function of the optimized axis of symmetry.

\* \* \* \* \*